(12) United States Patent
Dolev et al.

(10) Patent No.: US 9,742,739 B2
(45) Date of Patent: Aug. 22, 2017

(54) ACCUMULATING AUTOMATA AND CASCADED EQUATIONS AUTOMATA FOR NON-INTERACTIVE AND PERENNIAL SECURE MULTI-PARTY COMPUTATION

(71) Applicant: B.G. Negev Technologies and Applications Ltd., Beer Sheva (IL)

(72) Inventors: Shlomo Dolev, Omer (IL); Niv Gilboa, Tel Aviv (IL); Ximing Li, Beer Sheva (IL)

(73) Assignee: SECRETSKYDB LTD., Beer Sheva (IL)

( * ) Notice: Subject to any disclaimer, the term of this patent is extended or adjusted under 35 U.S.C. 154(b) by 125 days.

(21) Appl. No.: 14/786,656

(22) PCT Filed: Apr. 23, 2014

(86) PCT No.: PCT/IL2014/050372
§ 371 (c)(1),
(2) Date: Oct. 23, 2015

(87) PCT Pub. No.: WO2014/174516
PCT Pub. Date: Oct. 30, 2014

(65) Prior Publication Data
US 2016/0149866 A1    May 26, 2016

Related U.S. Application Data

(60) Provisional application No. 61/815,748, filed on Apr. 25, 2013, provisional application No. 61/870,838, filed on Aug. 28, 2013.

(51) Int. Cl.
*H04L 29/06* (2006.01)
*H04L 9/00* (2006.01)
(Continued)

(52) U.S. Cl.
CPC ...... *H04L 63/0428* (2013.01); *G06F 21/6218* (2013.01); *G06F 21/6245* (2013.01);
(Continued)

(58) Field of Classification Search
CPC .................................................. H04L 63/0428
(Continued)

(56) References Cited

U.S. PATENT DOCUMENTS

2008/0208565 A1* 8/2008 Bisegna .................. G06F 17/28
704/4

FOREIGN PATENT DOCUMENTS

WO   WO 2008/135951 A1   11/2008

OTHER PUBLICATIONS

Blanton, M., et al., "Secure Outsourcing of DNA Searching via Finite Automata," In Data and Applications Security and Privacy XXIV, pp. 49-64, Springer Berlin Heidelberg, Dec. 31, 2010, Retrieved from the Internet, <URL:http://www.sculb.edu/~maliasga/papers/dbsec10,pdf>.
(Continued)

*Primary Examiner* — Longbit Chai
(74) *Attorney, Agent, or Firm* — Fenwick & West LLP

(57) ABSTRACT

A method of securely executing practically unbounded input stream of symbols, by non-interactive, multi-party computation, according to which the input stream is distributed among a plurality of parties, which do not communicate among themselves throughout execution, by a dealer with a secret initial state. The dealer distributes shares of the secret state between the parties. The input stream is executed by a finite-state automaton which may be an accumulating automaton with accumulating nodes or an automaton that is defined by a series of cascaded equations. During any execution stage, the input stream and the current state of the original automaton are concealed from any coalition of
(Continued)

participants being smaller than a given threshold. Upon receiving a signal from the dealer, the parties terminate the execution and submit their internal state to the dealer, which computes the current state that defines the computation result.

29 Claims, 7 Drawing Sheets

(51) Int. Cl.
  *H04L 9/08* (2006.01)
  *G06F 21/62* (2013.01)
  *H04L 12/58* (2006.01)
(52) U.S. Cl.
  CPC .............. *H04L 9/008* (2013.01); *H04L 9/085* (2013.01); *H04L 51/32* (2013.01); *H04L 63/0414* (2013.01); *H04L 65/403* (2013.01); *H04L 2209/46* (2013.01)
(58) Field of Classification Search
  USPC .......................................................... 726/30
  See application file for complete search history.

(56) References Cited

OTHER PUBLICATIONS

Dolev, S., et al., "Private and Perennial Distributed Computation," Workshop on Cryptography and Security in Clouds, pp. 1-5, Zurich, Dec. 31, 2011, Retrieved from the Internet, <URL:httP://www.zurich.ibm.com/~cca/csc2011/submissions/garay.pdf>.
Patent Cooperation Treaty, International Search Report, International Patent Application No. PCT/IL2014/050372, Aug. 7, 2014, 3 Pages.
Patent Cooperation Treaty, Written Opinion of the International Searching Authority, International Patent Application No. PCT/IL2014/050372, Aug. 7, 2014, 9 Pages.
Benaloh, J.C. et al., "Secret Sharing Homomorphisms: Keeping Shares of a Secret Sharing," CRYPTO, Lecture Notes in Computer Science, 1986, pp. 251-260.
Bethencourt, J. et al., "New Techniques for Private Stream Searching," ACM Transactions on Information and System Security, 2009, pp. 16:2-16:32, vol. 12, No. 3.
Blakely, G.R., "Safeguarding Cryptographic Keys," International Workshop on Managing Requirements Knowledge, 1979, pp. 313-317.
Brakerski , Z. et al., "Fully Homomorphic Encryption Without Bootstrapping," Electronic Colloquium on Computational Complexity (ECCC), 2011, pp. 1-26, vol. 18:111.
Cramer, R. et al. "Share Conversion, Pseudorandom Secret-Sharing and Applications to Secure Computation," Lecture Notes in Computer Science, 2005, pp. 342-362.
Damgard, I. et al. "Efficient Conversion of Secret-Shared Values Between Different Fields", IACR Cryptology ePrint Archive, 2008, 6 pages.
Dolev, S. et al., "Accumulating Automata and Cascaded Equations Automata for Communicationless Information Theoretically Secure Multi-Party Computation (Extended Abstract)," ACM, 2015, pp. 21-29.

Dolev, S. et al., "Accumulating Automata and Cascaded Equations Automata for Communicationless Information Theoretically Secure Multi-Party Computation (Preliminary Report)," 2015, pp. 1-22.
Dolev, S. et al. "Brief Announcement: Swarming Secrets,",47th Annual Allerton Conference on Communication, Control, and Computing, 2009, pp. 231-232.
Dolev, S. et al., "Brief Announcement: Efficient Private Distributed Computation on Unbounded Input Streams," Lecture Notes in Computer Science, 2012, pp. 431-432, vol. 761.
Dolev, S. et al. "Secret Sharing Krohn-Rhodes: Private and Perennial Distributed Computation," Innovations in Computer Science, 2011, pp. 32-44.
Dolev, S. et al. "Secret Swarm Unit, Reactive k-Secret Sharing," Lecture Notes in Computer Science, 2007, pp. 123-137.
Dolev, S. et al., "Secret Swarm Unit: Reactive k-Secret Sharing," Ad Hoc Networks, 2012, pp. 1291-1305, vol. 10, No. 7.
Du, W. et al., "Secure Multi-Party Computation Problems and Their Applications: A Review and Open Problems," Proceedings of New Security Paradigms Workshop, ACM, Sep. 11-13, 2011, pp. 13-22.
Fletcher, C. et al., "Compilation Techniques for Efficient Encrypted Computation," Cryptology ePrint Archive Report, 2012/266, 2012, 16 pages.
Gentry, C. et al., "Fully Homomorphic Encryption Using Ideal Lattices," STOC, ACM, 2009, pp. 169-178.
Gentry, C. et al., "Fully Homomorphic Encryption without Squashing Using Depth-3 Arithmetic Circuits," FOCS, IEEE, Sep. 14, 2011, 21 pages.
Gentry, C. et al., "Homomorphic Evaluation of the AES Circuit," in Safavi-Naini and Canetti, [23], Jan. 3, 2015, pp. 850-867.
Gentry, C. et al., "Implementing Gentry's Fully-Homomorphic Encryption Scheme," IACR Cryptology ePrint Archive, 2010, pp. 1-29, vol. 520.
Gentry, C., "Toward Basing Fully Homomorphic Encryption on Worst-Case Hardness," CRYTPO, vol. 6223 of Lecture Notes in Computer Science, Springer, 2010, pp. 116-137.
Goldreich et al., The Foundations of Cryptography—vol. 2, Basic Applications, Cambridge University Press, 2004, pp. 693-727.
Goldwasser, S., "Multi-Party Computations: Past and Present," PODC, ACM, 1997, pp. 1-6.
Mohassel, P. et al., "An Efficient Protocol for Oblivious DFA Evaluation and Applications," CT-RSA, vol. 7178 of Lecture Notes in Computer Science, Springer, 2012, pp. 398-415.
Ostrovsy, R. et al., "Private Searching on Streaming Data," Journal of Cryptology, 2007, pp. 397-430, vol. 20, No. 4.
Ostrovsy, R. et al., "Private Searching on Streaming Data," 2007, 18 pages.
"Advances in Cryptology—CRYPTO 2012—32nd Annual Cryptology Conference, Santa Barbara, CA, USA, Aug. 19-23, 2012, Proceedings," ,Safavi-Naini, R. et al., editors, vol. 7417 of Lecture Notes in Computer Science, Springer, 2012, 902 pages.
Shamir, A. "How to Share a Secret," Communications of the ACM, Nov. 1979, pp. 612-613, vol. 22, No. 11.
Van Dijk, M. et al., "Fully Homomorphic Encryption Over the Integers," EUROCRYPT, vol. 6110 of Lecture Notes in Computer Science, Springer, 2010, pp. 24-43.
Waters, B., "Functional Encryption for Regular Languages," In Safavi-Naini and Canetti [23], pp. 218-235.
Yao, A.C. "Protocols for Secure Computations (extended abstract)," FOCS, IEEE Computer Society, 1982, pp. 160-164.

* cited by examiner

ACCUMULATING AUTOMATA AND CASCADED EQUATIONS AUTOMATA FOR NON-INTERACTIVE AND PERENNIAL SECURE MULTI-PARTY COMPUTATION

RELATED APPLICATIONS

This application is a 35 U.S.C. 371 national stage filing of International Application No. PCT/IL2014/050372, filed on Apr. 23, 2014, which claims priority to U.S. Provisional Patent Application No. 61/815,748, filed on Apr. 25, 2013, and U.S. Provisional Patent Application No. 61/870,838, filed on Aug. 28, 2013. The contents of the aforementioned applications are hereby incorporated by reference.

FIELD OF THE INVENTION

The present invention relates to the field of distributed computing, such as cloud computing. More specifically, the present invention is related to a method of securely executing an unbounded input stream by non-interactive, multi-party distributed computation.

BACKGROUND OF THE INVENTION

Cloud computing is a form of distributed computing over a network, with the ability to run a program on many connected computers at the same time. The same concept is also used for private storage. Such distributed computing is directed to running applications that share data or support the critical operations of an enterprise, with rapid access to flexible and low cost IT resources. These services are based on-demand delivery of IT resources via the Internet with pay-as-you-go pricing, and are offered by several vendors such as Microsoft and Amazon Web Services. However, the cloud computing model cannot really protect user's privacy, since the user cannot be sure that there will be no leakage of some data, on which he has no control.

Information theoretically secure multi-party computation implies severe communication overhead among the computing participants, as there is a need to reduce the polynomial degree after each multiplication. In particular, when the input is (practically) unbounded, the number of multiplications and therefore, the communication bandwidth among the participants may be practically unbounded. In some scenarios, the communication among the participants should better be avoided altogether, avoiding linkage among the secret share holders. For example, when processes in computing clouds operate over streaming secret shares without communicating with each other, they can actually hide their linkage and activity in the cloud. An adversary that is able to compromise processes in the cloud may need to capture and analyze a very large number of possible shares.

If a dealer wants to repeatedly compute functions on a long file with the assistance of in servers, the dealer does not wish to leak either the input file or the result of the computation to any of the servers. There are two constraints: (1) The dealer is allowed to share each symbol of the input file among the servers and is allowed to halt the computation at any point (the dealer is otherwise stateless). (2) each server is not allowed to establish any communication beyond the shares of the inputs that it receives and the information it provides to the dealer during reconstruction.

Secure multi-party computation (MPC) is a powerful concept in secure distributed computing. The goal of secure MPC is to enable a set of in mutually distrusting parties to jointly and securely compute a function $f$ of their private inputs, even in the presence of a computationally unbounded active adversary Adv. For example, two millionaires can compute which one is richer, without revealing their actual worth. In secure MPC, two or more parties want to conduct a computation based on their private inputs, but neither party is willing to disclose its own input to anybody else.

Secure multi-party computation participants can compute any function on any input, in a distributed network where each participant holds one of the inputs, ensuring independence of the inputs, correctness of the computation, and that no information is revealed to a participant in the computation beyond the information that can be inferred from that participants' input and output. Like other cryptographic protocols, the security of MPC protocol can rely on different assumptions:

It can be computational, namely, based on the common belief on the complexity of mathematical tasks such as factoring, or information theoretically secure which is unconditional secure, and usually based on secret sharing schemes.

The settings in which the scheme is described may differ, possibly assuming that participants use a synchronized network, that a secure and reliable broadcast channel exists, that a secure communication channel exists between every pair of participants, such that an adversary cannot tap-in, modify or generate messages in the channel, and alike.

Secure multi-party computation can be realized in various settings for computing general functions. However, the general scheme may be impractical due to efficiency reasons, partly due to the communication required among the participants.

In communicationless information theoretically secure multi-party computation over long input streams, a dealer D may secretly share an initial value among the in servers (participants). Subsequently, the dealer is responsible for handling the input stream (or an input file) and distributing appropriate shares to the participants. If the dealer is assumed to be a stateless dealer, the dealer is allowed to temporarily store the current input to the system, process the input and send (not necessarily simultaneously) secret shares of the inputs to the participants. One of the participants may act as the dealer, or the participants may alternate among themselves in serving as the dealer. In such a case, one participant communicates with the rest to convey the input (shares), still the inherent quadratic complexity needed to reduce the polynomial degree in the classical information theoretically secure multi-party computation should be avoided. Moreover, in case the input symbols have been shared and assigned to the participants in the initialization phase, every participant can independently (and asynchronously) process the shares of the input, and sends the result when the global output has to be determined. For example, assigning shares of a file up-front to participants to allow repeated search of patterns, without revealing neither the file nor the search result to the participants. No participant returns any information back during the execution of the algorithm. At any point in the execution, the dealer may ask some participants to send their results back, then the dealer can reconstruct the actual result of the algorithm.

PRIOR ART SOLUTIONS

Multi-Party Computation

Benaloh et al ("Secret sharing homomorphisms: Keeping shares of a secret sharing" CRYPTO, Lecture Notes in Computer Science, pp 251-260, 1986) describes the homomorphism property of Shamir's linear secret sharing scheme, with the help of communication to decrease the polynomial degree. Cramer et al. ("Share conversion, pseudorandom secret-sharing and applications to secure computation", Lecture Notes in Computer Science, pp 342-362, 2005) presented a method for converting shares of a secret into shares of the same secret in a different secret-sharing scheme using only local computation and no communication between players. They showed how this can be combined with any pseudorandom function to create, from initially distributed randomness, any number of Shamir's secret-shares of (pseudo)random values without communication. Damgard et al. ("Efficient conversion of secretshared values between different fields", IACR Cryptology ePrint Archive, 2008) showed how to effectively convert a secret-shared bit over a prime field to another field. By using a pseudorandom function, they showed how to convert arbitrary many bit values from one initial random replicated share.

Outsourcing Finite Automata

Waters ("Functional encryption for regular languages. In Safavi-Naini and Canetti, pp 218-235 provides a functional encryption system that supports functionality for regular languages. In this system a secret key is associated with a deterministic finite automaton (DFA) M. A ciphertext, ct, encrypts a message msg associated with an arbitrary length string w. A user is able to decrypt the ciphertext ct if and only if the automaton M associated with his private key accepts the string w. Motivated by the need to outsource file storage to untrusted clouds while still permitting limited usage of that data by third parties, Mohassel et al. ("An efficient protocol for oblivious dfa evaluation and applications", Lecture Notes in Computer Science, pp 398-415, 2012) presented practical protocols by which a client (the third-party) can evaluate a DFA on an encrypted file stored at a server (the cloud), once authorized to do so by the file owner. However, all the above schemes are based on unproven, commonly believed to be hard mathematical tasks and are not information theoretically secure.

Perennial Distributed Computation on Common Inputs

Dolev et al. ("Secret swarm unit, reactive k-secret sharing" Lecture Notes in Computer Science, pp 123-137, 2007 and "Reactive k-secret sharing", Ad Hoc Networks, 2012) presented the settings for infinite private computation and presented few functions that can operate under a global input. Dolev et al. ("Swarming secrets", 47th annual Allerton conference on Communication, control, and computing, 2009) presented schemes that support infinite private computation among participants, implementing an oblivious universal Turing machine. At each single input of the machine, participants need to broadcast information in order to reduce the degree of the polynomial used to share secrets. Based on combination of secret-sharing techniques and the decomposition of finite state automata, Dolev et al. "Secret sharing krohn-rhodes: Private and perennial distributed computation", ICS, pp 32-44, 2011) proposed the first communicationless scheme for private and perennial distributed computation on common inputs in a privacy preserving manner, assuming that even if the entire memory contents of a subset of the participants are exposed, no information about the state of the computation is revealed. This scheme does not assume a priori bound on the number of inputs. However, the scheme assumes a global input which reveals information on the computation and the computational complexity of the algorithm of each participant is exponential in the automata number of states. Relying on the existence of one-way functions or common long one time pads, Dolev et al. showed how to process a priori unbounded number of inputs for inputs over a Finite State Automaton (FSA) at a cost that is linear in the number of FSA states. Although the authors can hide the current state of the FSA, the dealer must supply the input symbols in plain text to each participant.

Secure Computation on Data Stream

Ostrovesky et al. ("Private searching on streaming data. Journal of Cryptology, 2007) defined the problem of private filtering where a data stream is searched for predefined keywords. The schemes are also implemented by Paillier homomorphic cryptosystem. The proposed scheme has been by reducing the communication and storage complexity.

Fully Homomorphic Encryption

Gentry et al ("Fully homomorphic encryption using ideal lattices", STOC, pp 169-178 ACM, 2009) presented the first fully homomorphic encryption (FHE) scheme which is capable of performing encrypted computation on Boolean circuits. A user specifies encrypted inputs to the program, and the server computes on the encrypted inputs without gaining information concerning the input or the computation state. Following the outline of Gentry's, many subsequent FHE schemes are proposed and some of which are even implemented. However, the FHE schemes that follow the outline of Gentry's original construction are inefficient in that their per-gate computation over-head is a large polynomial in the security parameter and are furthermore only computationally secure.

All the above schemes are based on unproven commonly believed to be hard mathematical task and therefore, are not information theoretically secure.

It is therefore an object of the present invention to provide a method for securely executing an unbounded input stream by non-interactive, multi-party distributed computation of a specific type of automata.

It is another object of the present invention to provide a method for securely executing an unbounded input stream by non-interactive, multi-party distributed computation, in which computation is carried out by several participants over unbounded stream of secret shared inputs.

It is a further object of the present invention to provide a method for securely executing an unbounded input stream by non-interactive, multi-party distributed computation, in which the participants do not communicate among themselves throughout the execution.

Other objects advantages of the present invention will become clear as the description proceeds.

SUMMARY OF THE INVENTION

The present invention is directed to a method of securely executing an unbounded or practically unbounded input stream, by non-interactive, multi-party computation, comprising the following steps:
a) distributing the input stream among a plurality of parties, which do not communicate among themselves throughout execution, by a dealer (which may be stateless) having a secret initial state, the dealer distributes shares of the secret state between the parties;
b) providing a finite-state automaton defined by a series of cascaded equations, for executing the input stream, the automaton being a cascade product of component automata of different types and shared by the parties;
c) during any execution stage, concealing the input stream and the current state of the original automaton from any coalition of participants being smaller than a given threshold;

d) upon receiving a signal from the dealer, causing the parties to terminate the execution and to submit their internal state to the dealer; and
e) computing the current state that defines the computation result by the dealer.

The automaton may be a reset automaton, or a permutation automaton, where all the component permutation automata are powers of the same automaton.

The results and inputs of the first equation may be used to compute the result of the subsequent equation.

Each cascaded equation may be mapped to an automaton by mapping variables of the equations into a node of the automaton.

Several cascade automata may be executed in parallel, to get a product of automata.

At the execution stage, the dealer may repeatedly send secret shares of the input stream and each party computes new values.

In one aspect, the execution of cascaded equations automata is performed by:
 a) an initial stage, during which the variable's values in the cascaded equation automata are shared among several parties using secret sharing, while each symbol of the input stream is also secret shared;
 b) an execution stage, during which each input symbol is mapped to an input vector and each element in the input vector is secret shared into three parts by a random polynomial of a degree of at least 1; and
 c) a collection stage, during which all the parties send the values back, to reconstruct the actual value indicating the current state of the automaton.

The communication-less information theoretically secure multi-party computation may be performed over practically infinite input streams, or oven infinite input streams.

The dealer may temporarily store and process the input stream, and send different secret shares of the input streams to the parties, which do not communicate with each other.

The parties may not return any information back.

At any point in the execution, in response to a call to the parties from the dealer to send their partial results back, the dealer may reconstruct the actual computation result, based on the partial results.

The series of cascaded equations may be executed serially, starting from the first equation, then the second equation and so forth, until the execution of the last equation is completed.

The cascaded equations may be executed by the parties by:
 a) initializing all the participants, during the initial stage;
 b) during the execution stage, sending shares to all participants, wherein each participant executes its equations independently; and
 c) during the Collection stage, collecting the shares back from all participants and reconstructing the result.

In one aspect, during the initial stage:
 a) each variable's values in the cascaded equation automata are shared among several participants using secret sharing;
 b) entries of the vector that represent each symbol of the input are also secret shared; and
 c) if one equation includes multiplication, the degree of the polynomial that encodes the value of the variable will be more than the degree of the variable in the preceding equation.

The automaton may be executed to obtain:
string matching;
recognizing regular language;
recognizing context free language;
recognizing context sensitive language.

A string matching search may be performed on a file by:
 a) secret sharing the file and storing the shares in clouds for further computation;
 b) repeatedly and iteratively running computations on the secret shared file by constructing the accumulating automaton for the required computation;
 c) sending a copy of the automaton to each cloud that maintains shares of the file;
 d) allowing each cloud to perform calculations on the accumulating automaton using its share as the input;
 e) allowing each cloud to send the final state of its accumulating automaton back as an answer for a computation request; and
 f) reconstructing the state of each node of the accumulating automaton to obtain the computation result, based on the final states received from all clouds.

A copy of the automaton may be sent to each cloud in different time.

The present invention is also directed to a method of securely executing a bounded input stream, by non-interactive, multi-party computation, comprising the following steps:
 a) distributing the input stream among a plurality of parties, which do not communicate among themselves throughout execution, by a dealer having a secret initial state, the dealer distributes shares of the secret state between the parties;
 b) providing an accumulating automaton for executing the input stream, the accumulating automaton is shared by the parties and represented by a directed graph and having regular nodes, an accumulating node and transitions between nodes, such that:
  b.1) an accumulating node accumulates values, while the regular nodes recompute values, based on values of their neighboring nodes;
  b.2) the value of the encodes the number of times a pattern has occurred in the input stream;
 c) during any execution stage, concealing the input symbol and the current state of the original automaton from any coalition of participants being smaller than a given threshold;
 d) upon receiving a signal from the dealer, causing the parties to terminate the execution and to submit their internal state to the dealer; and
 e) computing the current state that defines the computation result by the dealer.

Wrong shares elimination may be carried out whenever one or more parties send corrupted information.

The accumulating automaton may be a DAG Accumulating Automaton (DAA) represented by a Directed Acyclic Graph (DAG) structure.

The accumulating automaton may be marked by a vector of values, one integer value for each node in the accumulating automaton.

The accumulating automaton may be executed by:
 a) assigning initial value to a node of the accumulating automaton;
 b) retrieving symbols from the input stream that is sent by the dealer and input the symbols to the accumulating automaton; and
 c) responsive to inputting the symbols, triggering transitions of the automaton to new marking.

In one aspect, whenever communicationless multi-party computation is required, using in servers, the following steps are performed:

a) secret sharing the marking of the original DAA into in shares by the dealer;
b) assigning each share to one of the servers;
c) secretly sharing by the dealer, each input into in shares and sending each share to a distinct server;
d) executing the local DAA share and local input share of each server and obtaining a share of the new marking of the local DAA;
e) allowing the dealer to activate all in servers to send executed shares back;
f) collecting all executed shares; and
g) constructing the current marking of the original DAA.

The DAA may be executed to obtain:
string matching that is performed for supporting database updates that include delete or insert operations;
supporting search, insert, and delete database operations;
recognizing regular language;
recognizing context free language;
recognizing context sensitive language.

The DAA may be implemented as a flip flop automaton.

The present invention is further directed to a system for securely executing an unbounded or practically unbounded input stream of symbols, by non-interactive, multi-party computation, which comprises:

a) a dealer being a computerized apparatus having a secret initial state, the dealer distributing the input stream among a plurality of parties being servers or computation clouds, which do not communicate among themselves throughout execution and distributing shares of the secret state between the parties;

b) a finite-state automaton defined by a series of cascaded equations, for executing the input stream, the automaton being a cascade product of component automata of different types and shared by the parties, or being an accumulating automaton for executing the input stream, the accumulating automaton is shared by the parties and represented by a directed graph and having regular nodes, an accumulating node and transitions between nodes, such that:
  b.1) an accumulating node accumulates values, while the regular nodes recompute values, based on values of their neighboring nodes;
  b.2) the value of the node that encodes the number of times a pattern has occurred in the input stream;

wherein the dealer is adapted to:
c) during any execution stage, conceal the input stream and the current state of the original automaton from any coalition of participants being smaller than a given threshold;
d) upon receiving a signal from the dealer, cause the parties to terminate the execution and to submit their internal state to the dealer; and
e) compute the current state that defines the computation result.

DETAILED DESCRIPTION OF THE INVENTION

Figure 1:
FIG. 1 illustrates a string matching example.

The present invention proposes a scheme for information theoretically secure, non-interactive, multi-party computation of a specific type of automata. The computation is carried by several participants over unbounded stream of secret shared inputs and these participants do not communicate among themselves throughout the execution. At any stage of the scheme, the input symbol and current state of the original automaton are concealed perfectly against any coalition of participants that is not larger than a given threshold.

The scheme performs the computation correctly for any finite-state automaton, which can be described as a cascade product (or equivalently wreath product) of component automata of two types.

A component automaton is either a reset automaton, or a permutation automaton, where all the component permutation automata are powers of the same automaton.

It is required that the parties process an unbounded stream of input and that the scheme be non-interactive. In addition, it is required that the input stream is not public, but is shared among the parties so that any small coalition of participants can't obtain any input symbol. Using this approach, both the state of A and the input stream are secret for any small coalition of parties.

A scheme to correctly compute the final state of an automaton is presented, where all parties share the FSA A and a dealer has a secret initial state. The dealer distributes shares of the secret state to the participants, which then receive a stream of input.

For each input symbol that arrives, each of the participants receives only a share of the symbol. This way, any small enough coalition of parties (excluding the dealer) does not have any information on the initial state or on any input symbol. Finally, given a signal from the dealer, the participants terminate the execution and submit their internal state to the dealer, who computes the current state that defines the computation result.

In the proposed scheme, the dealer correctly computes the final state of A if A can be represented as a cascade (wreath) product of component automata of the following two types: the accumulating automata and the cascaded equations automata. Both types of automata will be used in the construction of secure and private multi-party computation among participants that use no communication among themselves while processing practically or really unbounded input stream.

According to the present invention, a very long file can be secret shared and stored. None of the parties can gain any information about the files. String matching (searches) can be repeatedly performed by these cloud agents without them knowing anything concerning the search result.

It is assumed that there is one dealer D who wants to perform secure private computation over a very long input stream which may be actually unbounded. The dealer uses in cloud servers or agents $P_1, \ldots, P_m$ which perform a computation over the input stream received from D. The dealer D sends different input shares to every agent. Agents do not communicate with each other. Any agent cannot learn anything about the original inputs that D partitions to shares, as the dealer uses Shamir's secret sharing to partition any symbol of the original input to be sent to the agents. At any given stage, the dealer D may collect the state of the agents and obtain the computation result. The agents use memory that is logarithmic in the length of the input, and therefore, can accommodate practically unbounded inputs.

Secure Private Multi-Party Computation for String Matching

String matching is a basic task used in a variety of scopes. A pattern (string) has to be found as part of text processing, also as part of malware (virus) defense, pattern recognition, bioinformatics and database query. It is possible to use the method proposed by the present invention to perform string matching that can support database updates, such as delete or insert operations.

The inputs are text and a pattern, the pattern is usually much shorter than the text. The goal is to find whether the pattern appears in the text or not.

FIG. 1 describes a simple example of string matching. One brute force method for string matching is to check every single character as being the first character of the pattern and match the entire pattern against the text, starting at this character position.

String Matching Algorithm Over Directed Graph

A simplified non-secure version of the algorithm will be described first, followed by the way to obtain information theoretically secure computation extending the simplified version.

Figure 2:
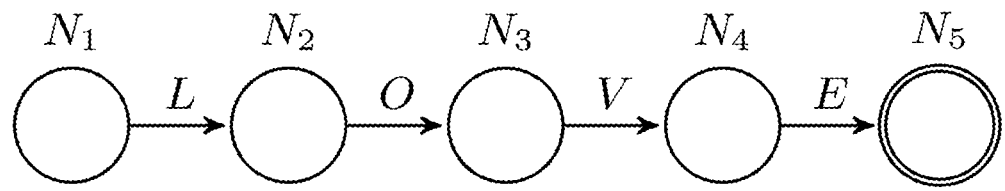
FIG. 2 illustrates a string matching algorithm with one wildcard "k" in the pattern $(\alpha\beta\alpha^*\alpha\alpha)$.

FIG. 2 depicts a directed graph G which will be used to implement the string matching task of FIG. 1. G is used to check whether there is a substring LOVE in the text. In G, there are five nodes labeled $N_1$ to $N_5$ and four arcs labeled L, O, V, E, respectively. $N_5$ is a special node called an accumulating node that is depicted by two concentric circles.

Execution of the String Matching Algorithm

Each input value assigns a new (integer) value to every node. $N_i^{(j)}$ denotes the value of the node $N_i$ immediately after step j. According to the pattern, an input vector $\vec{v}$ is defined, in which each element matches one corresponding element in the pattern. Since the pattern consists of four characters, {L, O, V, E}, a vector of four binary values that represents each possible character in the pattern is used. If the input character does not appear in the pattern, then the value of the vector $\vec{v}$ is set to (0,0,0,0). In particular, when the input symbol is O then the vector $\vec{v}$ is set to (0,1,0,0) and when the input symbol is, say C, then the vector $\vec{v}$ is set to (0,0,0,0). The value of $N_1$ is initialized to be 1 and is unchanged during the entire string matching process. For any given input vector $(v_1,v_2,v_3,v_4)$, the values of all the marking of nodes of the graph are simultaneously computed as follows $$N_2^{(i+1)}=N_1^{(i)} \cdot v_1$$

$$N_3^{(i+1)}=N_2^{(i)} \cdot v_2$$

$$N_4^{(i+1)}=N_3^{(i)} \cdot v_3$$

$$N_5^{(i+1)}=N_5^{(i)}+N_4^{(i)} \cdot v_4 \qquad \text{Eq. (1)}$$

Equation 1 defines the transition functions for the string matching algorithm. $N_5$, which is an accumulated node, accumulates values, while the rest of the nodes recompute values based only on values of the neighboring nodes.

Result of the Algorithm

At any time, the value of the node $N_5$ can be checked. If $N_5>0$ then there is at least one match. Actually, the value of the node $N_5$ encodes the number of times the pattern has occurred in the input stream. It is assumed that the number of occurrences does not exceed the maximal integer that the system can maintain and represent for $N_5$.

Communicationless Secure Private Multi-Party String Matching Protocol

The following example presents a secure multi-party string matching algorithm using Shamir's secret sharing scheme to mimic the algorithm presented above. Among the whole protocol, the computation field is a big finite field. It is assumed that all the computations will not overflow during the execution of the protocol.

Initial Stage

Nodes' values are shared among several participants using secret sharing and so are the entries of the vector that represent each symbol of the input text. It is assumed that the input symbols are represented by secret shares of polynomial of degree 1. Since the transition function includes multiplication, the degree of the polynomial that encodes the value of a certain node is one more than the degree of the preceding node. In this particular example, at least six participants should be used to ensure that the result encoded in $N_5$ can be decoded.

For simplicity, it is assumed there are six participants $P_1, \ldots, P_6$ that undertake the task of multi-party computation string matching. For the five nodes of the graph, five random polynomials $f_1$ to $f_5$ are defined, where $f_i$ is of degree i. Each corresponding polynomial is used to secret share each node's initial value among the six participants, where each partner $P_i$ receives one share. The initial share of the node $N_1$ that is maintained by the participants $P_i$ is denoted by $S_{P_i,N_j}^{(0)}$.

Execution Stage

Each symbol $\alpha$ is mapped to an input vector $\vec{v}$. Then each element in the input vector $\vec{v}$ is secret shared into six parts by a random polynomial of degree 1. Each share of the input vector is then sent to one of the participants. For the participant $P_i$, $1 \le i \le 6$, the corresponding shares of the input vector are denoted $(S_{i,v_1}, S_{i,v_2}, S_{i,v_3}, S_{i,v_4})$. The number 1 is also secret shared into six shares by a random polynomial of degree 1. The six shares are denoted as follows:

$$S_{1,v_0}, S_{2,v_0}, S_{3,v_0}, S_{4,v_0}, S_{5,v_0}, S_{6,v_0}$$

where the share $S_{i,v_0}$ will be sent to the participant $P_i$.

Immediately after processing the $k^{th}$ input symbol, the value of the (share of) node $N_j$ that is stored by the participant $P_i$ is denoted as $S_{P_i,N_j}^{(k)}$. When the dealer sends a vector as follows:

$$(S_{i,v_0}, S_{i,v_1}, S_{i,v_2}, S_{i,v_3}, S_{i,v_4})$$

$P_i$ executes the following transitions:

$$S_{P_i,N_1}^{(k+1)} = S_{i,v_0}$$

$$S_{P_i,N_2}^{(k+1)} = S_{P_i,N_1}^{(k)} \cdot S_{i,v_1}$$

$$S_{P_i,N_3}^{(k+1)} = S_{P_i,N_2}^{(k)} \cdot S_{i,v_2}$$

$$S_{P_i,N_4}^{(k+1)} = S_{P_i,N_3}^{(k)} \cdot S_{i,v_3}$$

$$S_{P_i,N_5}^{(k+1)} = S_{P_i,N_5}^{(k)} + S_{P_i,N_4}^{(k)} \cdot S_{i,v_4}$$

Collection Stage

Whenever it is desired to compute the result of the algorithm, all the participants are asked to send the value that corresponds to $N_5$ back. Having the shares of all participants, it is possible to construct the actual value of $N_5$ using Lagrange interpolation. The value obtained indicates whether the search is successful in finding the string or not.

Analysis of the System

The greatest value is associated with the node $N_5$ where this value represents the number of times the pattern was found in the text, namely, is bounded by the length of the input text. Thus, for every practical system a field that can be represented by a counter of, say, 128 bits will surely suffice.

The participants do not know the inputs and the results during the entire execution of the string matching. It is possible to secure the pattern by executing such string matching over all possible strings, collect all results, and compute only the result of the pattern of interest.

Matching Several Strings Simultaneously

Figure 3:
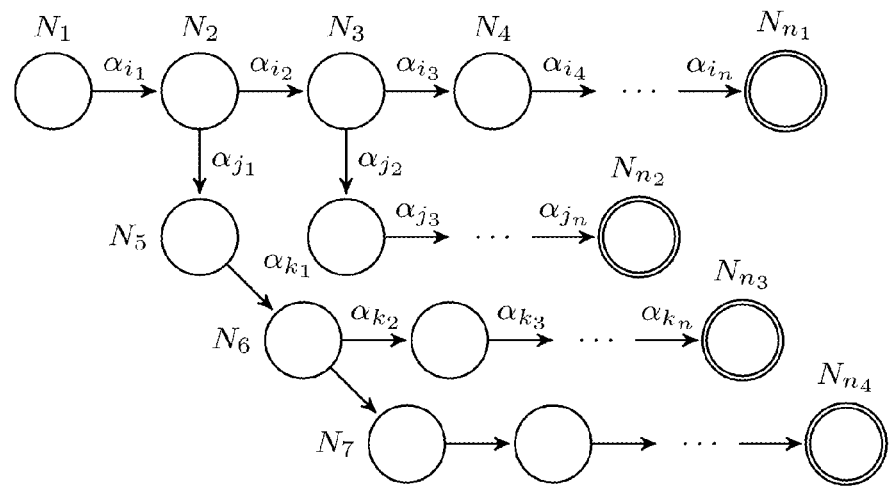
FIG. 3 illustrates an example of a DAG accumulating automaton $DAA^{\alpha\beta\gamma}$ and the initial marking.

The above method also works for simultaneous multiple strings matching, which means that it is possible to search more than one string simultaneously. An example of a directed graph for matching more than one string at the same time is described in FIG. 3.

General String Matching

To allow any string matching, the basic wildcard characters (characters that can be used to substitute for any other character or characters in a string) "?" and "*", will be implemented.

String Matching Algorithm with Question Mark in the Pattern

Figure 4:
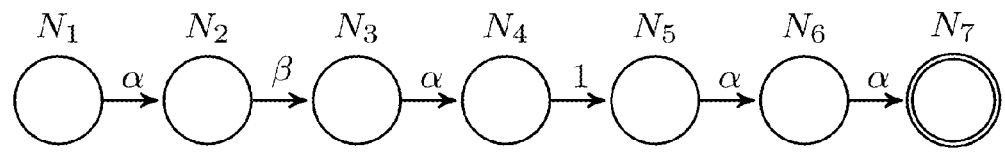
FIG. 4 illustrates the marking of $DAA^{\alpha\beta\gamma}$ after processing the input vector $\vec{v}=(0,1,0,0)$ which represents the input $\alpha$.

A character "?" is a character that may be substituted by any single character of all the possible characters. The directed graph for the matching algorithm that includes a question mark in the pattern is described in FIG. 4. The arc that represents the question mark is marked by the integer 1 and implies a transition that uses the marking of the previous node unchanged (multiplied by 1).

The transition function for this algorithm given in Equation 2 is similar to the one defined by Equation 1. In Equation 2, each node value is computed depending on the input and/or the previous state of the node. At step k, under each input, for each node $N_i$, the next value is computed as follows:

$$N_i^{(k+1)} = \begin{cases} v_0 & \text{if } i = 0 \\ N_{i-1}^{(k)} \cdot v_i & \text{if } N_i \text{ is not an accumulating node} \\ N_i^{(k)} + N_{i-1}^{(k)} \cdot v_i & \text{if } N_i \text{ is an accumulating node} \end{cases} \quad \text{Eq. (2)}$$

$$N_i^{(k+1)} = \begin{cases} v_0 & \text{if } i = 0 \\ N_{i-1}^{(k)} & \text{if the former edge is labeled by 1} \\ N_{i-1}^{(k)} \cdot v_i & \text{if } N_i \text{ is not an accumulating node;} \\ & \text{the former edge is not labeled by 1} \\ N_i^{(k)} + N_{i-1}^{(k)} \cdot v_i & \text{if } N_i \text{ is an accumulating node;} \\ & \text{the former edge is not labeled by 1} \end{cases} \quad \text{Eq. (3)}$$

String Matching Algorithm with a Star Wildcard in the Pattern

Figure 5:
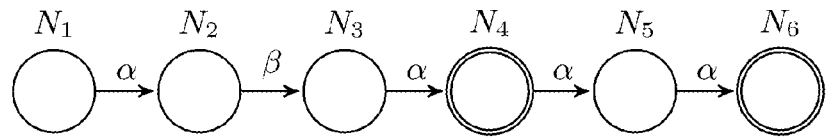
FIG. 5 illustrates a flip-flop automaton $A^f$.

A wildcard character "*" is a character that may be substituted by any number of the characters from all the possible characters. The directed graph for the matching algorithm for a pattern with a star is described in FIG. 5.

The transition function for this algorithm given in Equation (4) is similar to the one defined by Equation (3). In step k, under each input, for each node $N_i$, is computed as follows:

$$N_i^{(k+1)} = \begin{cases} v_0 & \text{if } i = 0 \\ N_{i-1}^{(k)} \cdot v_i & \text{if } N_i \text{ is not an accumulating node} \\ N_i^{(k)} + N_{i-1}^{(k)} \cdot v_i & \text{if } N_i \text{ is an accumulating node} \end{cases} \quad \text{Eq. (4)}$$

Any Secure Private String Matching Algorithm

In subsection 2.1 it is shown how to perform a basic string matching algorithm on a directed graph. In subsection 2.2 a secure and private implementation of the algorithm in the scenario of multi-party computation without communication, is detailed. Based on the basic implementation methods for implementing complicated string matching algorithms with wildcards in the pattern are presented. Thus, it is possible to implement (practically) any string matching algorithm securely and privately without communication between participants. The limitation of the value in the accumulating nodes is only theoretic, as for any text length n (say, even of practically not existing length of $2^{128}$ characters) and a pattern that yields l accumulating nodes, l·log n bits are needed to encode a state. The field of the numbers should be n or (slightly) larger.

Accumulating Automata

The string matching scheme is generalized by defining general accumulating automata (AA) and then, ways are shown to implement DAG accumulating automata (DAA) that are directed acyclic (not necessarily connected) graphs structure (DAG automata are natural extensions of tree automata, operating on DAGs instead of on trees). Then, ways to mark the AAs and the corresponding semantics for such marking are defined.

Accumulating automata are state-transition systems, as defined next:

Definition 1 An accumulating automaton is a triple $A = (V, \Sigma, T)$ where:

V is a set of variables, called nodes. A node is either regular or accumulating. For an accumulating automaton, marking operation means to assign value for each node and updating process of an automaton means to refresh all the nodes on new input. On updating, the new marking of a regular node is a function of the marking of neighboring nodes and the inputs, while the marking computation function of an accumulating node also considers the node's previous value;

$\Sigma$ is the alphabet, which is the set of input symbols (or characters) that the automaton should operate on;

T is a set of transitions. A triple $(p_1, \alpha, p_2) \in V \times \Sigma \to V$ is called a transition or arc, and is written $\delta(p_1,\alpha)=p_2$. For every $\delta$ in T there exist $p,q \in V$ and $\alpha \in \Sigma$ such that $\delta(p,\alpha)=q$ One may consider a more expensive operation, where $\delta(p,r,\alpha)=q$, $p \cdot r \cdot \alpha = q$ (or even an operation that multiplies the marking of more than two nodes). This type of operation yields an addition of the degree of the polynomial used to secret share the node.

An accumulating automaton is represented by a (possibly disconnected) directed graph where each regular node is depicted by a circle, accumulating node by two concentric circles, and transitions by (directed) arcs. Input symbols are labeled as symbols above the corresponding transitions.

Definition 2 (DAG Accumulating Automata—DAA): An accumulating automaton that defines a graph G that is acyclic, namely, without cycles and self-loops is a DAG accumulating automaton. In other words, DAG accumulating automaton is an accumulating automaton for which it holds that for any p in V, there does not exist $\alpha_1, \ldots, \alpha_n \in \Sigma$ and $\delta_1, \ldots, \delta_n \in T$, such that $$\delta_n) \ldots \delta_2(\delta_1(p,\alpha_1)),\alpha_2) \ldots )=p$$

Moreover, for every p and q in V, if there exists $\alpha \in \Sigma$ such that $\delta(p,\alpha)=q$ then $p \approx q$.

Definition 3 (Marking of accumulating automata): A marking of an accumulating automaton $A=(V,\Sigma,T)$ is a vector of values, one integer value for each node in V. A marked automaton A is a 4-tuple $(V,\Sigma,T,M)$, where M is the marking vector.

Definition 4 (Execution semantics of AA): The behavior of an accumulating automaton is defined as a relation on its markings, as follows. Assuming that immediately after the j step, node $p_i$ has the value $n_{p_i}^{(1)}$ then in the $(j+1)^{st}$ step, for all the transitions $\delta(p_t,\alpha_i)=p_i$, where $p_t \in V, \alpha_i \in \Sigma$, the new value of $p_i$ is computed as follows If $p_i$ is a regular node, then $$n_{p_i}^{(j+1)} = \sum_{\substack{\delta(p_t,\alpha_i)=p_i, \\ \forall p_t \in V; \alpha_i \in \Sigma}} n_{p_t}^{(j)} \cdot \alpha_i + \sum_{\substack{\delta(p_t,\alpha_i)=p_i, \\ \forall p_t \in V; \alpha_i = 1}} n_{p_t}^{(j)}$$

If $p_i$ is an accumulating node, then $$n_{p_i}^{(j+1)} = n_{p_i}^{(j)} + \sum_{\substack{\delta(p_t,\alpha_i)=p_i, \\ \forall p_t \in V; \alpha_i \in \Sigma}} n_{p_t}^{(j)} \cdot \alpha_i + \sum_{\substack{\delta(p_t,\alpha_i)=p_i, \\ \forall p_t \in V; \alpha_i = 1}} n_{p_t}^{(j)}$$

Marking and Execution of Accumulating Automata

Figure 6:
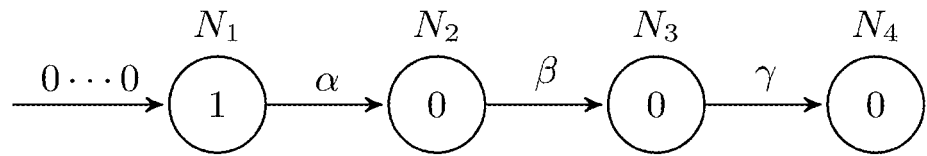
FIG. 6 illustrates an example of a DAG accumulating automaton $DAA^f$ for implementing the flip-flop automaton.

A simple example of a DAG accumulating automaton $DAA^{\alpha\beta\gamma}=(V,\Sigma,T)$ is illustrated in FIG. 6. By checking the marking of this automaton, it is possible to decide whether or not the input stream is $\alpha\beta\gamma$. It means that this DAG accumulating automaton will be used as deterministic finite automaton that checks whether the input language is $\alpha\beta\gamma$ or not. The four regular nodes are $V=\{N_1, N_2, N_3, N_4\}$. The input symbols are from the alphabet $\Sigma=\{\alpha,\beta,\gamma\}$. $N_1$ is a free node and is always assigned 0. The transitions are:

$N_2=\delta_1(N_1,\alpha)$ $N_3=\delta_2(N_2,\beta)$ $N_4=\delta_3(N_3,\gamma)$

Initial Marking of DAG Accumulating Automaton

The initial marking of the automaton is:

$N_1^{(0)}=1; N_2^{(0)}=0; N_3^{(0)}=0; N_4^{(0)}=0$

The initial marking automaton is depicted in FIG. 6.

Execution of the DAA $DAA^{\alpha\beta\gamma}$

Executing the DAA means to retrieve symbols one by one from the input stream and input to the DAA. The input triggers transitions of the automaton, resulting in a new marking. Assuming that the input symbol is $\alpha$, then the input vector is set to $\vec{v}=(v_0, v_1, v_2, v_3)=(0,1,0,0)$, and the new marking of the automaton computed.

Figure 7:
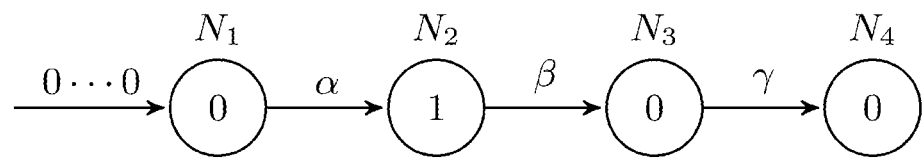
FIG. 7 illustrates an example of a DAG accumulating automaton $DAA^{(\alpha\beta\alpha)^*}$ for recognizing the regular language $(\alpha\beta\alpha)^*$ and the initial marking.

The transitions are computed as follows $N_1^{(1)}=v_0=0;$ $N_2^{(1)}=N_1^{(0)} \cdot v_1=1$ $N_3^{(1)}=N_2^{(0)} \cdot v_2=0;$ $N_4^{(1)}=N_3^{(0)} \cdot v_3=0$ Here, the new marking of the automaton is as in FIG. 7.

Description of the Marking of $DAA^{\alpha\beta\gamma}$

The marking of $DAA^{\alpha\beta\gamma}$ is changed by the input symbol that is sent by the dealer. At any time, it is possible to check the marking of $DAA^{\alpha\beta\gamma}$. If the marking is (0,0,1,0), then the input stream is $\alpha\beta$. An accumulating automaton $DAA^{\alpha\beta\gamma}$ can be used to accept the language $\alpha\beta\gamma$. The marking of $DAA^{\alpha\beta\gamma}$ reveals whether the input stream is accepted or not.

Correctness of $DAA^{\alpha\beta\gamma}$

The marking of the automaton under all possible input streams to check whether the automaton represents the function properly or not, will be analyzed. Prior to the first input the marking of $DAA^{\alpha\beta\gamma}$ is (1,0,0,0) and the state of the automaton is "rejected". If (1) the first input symbol is not $\alpha$; (2) the first input symbol is $\alpha$, the second symbol is not $\beta$; (3) the first two input symbols are $\alpha\beta$, the third symbol is not $\gamma$, then the marking of $DAA^{\alpha\beta\gamma}$ is (0,0,0,0), and therefore the state of the automaton is "rejected". In all the three cases above, any successive additional input symbol will not change the marking of the automaton to (0,0,0,1), thus, implying that the whole input stream will be rejected. In other words, if and only if the first three input symbols are $\alpha\beta\gamma$, then the marking of $DAA^{\alpha\beta\gamma}$ is (0,0,0,1), and the state of the automaton is "accepted". Any extra input(s) will change the marking of the automaton to (0,0,0,0), and the state of the automaton is also changed to "rejected".

DAG Accumulating Automata and Communicationless Multi-Party Computation

It is assumed that one dealer wants to execute DAA under a long input stream with the help of in servers without the leakage of the marking of the automaton and the whole input to the automaton. The dealer may secret share the marking of the DAA into in shares and assign each share to one of the servers. When the dealer wants to execute the DAA, he secretly shares each input into in shares and sends each share to a distinct server. Each server will manipulate its local DAA share and local input share to obtain a share of the new marking of the DAA. At some point, the dealer will ask all the servers to send shares back and use these shares to construct the current marking of the original DAA.

An unprivileged subgroup of the servers will have no information concerning the inputs (but an upper bound on its length) and/or the computation result. The servers do not know, in terms of information theoretical security, the actual value of the input sequence and the marking of the DAA.

Before stating the relationship between DAA and secret sharing, a route and the polynomial degree of a node in (the graph G of) a DAA are defined, as well as the polynomial degree of the entire DAA. The accumulating field of a DAA is also defined. A sequence of nodes $\{N_{i_1}, \ldots, N_{i_{k+1}}\}$ is a route, if there are a sequence of transitions $\{\delta_{j_1}, \ldots, \delta_{j_k}\}$ and input symbols $\{\alpha_{r_1}, \ldots, \alpha_{r_k}\}$ such that $$\delta_{j_1}(N_{i_1},\alpha_{r_1})=N_{i_2}, \ldots, \delta_{j_k}(N_{i_k},\alpha_{r_k})=N_{i_{k+1}}$$

The longest route always starts in a free node, i.e., a node with no incoming arcs. Let t be the secret sharing threshold, the minimal number of participants needed to reveal the automaton state, where t−1 is the polynomial degree in which the marking of the free nodes and the inputs are encoded.

Definition 5 (Polynomial Degree of a Node and a DAA):
Assuming t to be the secret sharing threshold, for any node N in a DAA, if the maximal length of a route from a free node to $N_i$ is len, the polynomial degree of $N_i$ is deg=(len+1)(t−1). The greatest polynomial degree of a node in a DAA is defined to be the polynomial degree of the DAA.

An accumulating automaton with cycles (beyond self-cycles with corresponding character 1 as demonstrated in the sequel) implies an infinite polynomial degree.

Theorem 1

For any DAA with polynomial degree d, it is possible to implement and execute the DAA among d participants without communication and hide the (practically) unbounded input stream except an upper bound on the length of the input.

Definition 6 (Accumulating Field of a DAA)

The maximal number that should be represented by a marking variable in a DAG accumulating automaton DAA is defined as accumulating field of DAA.

A sufficient accumulating field should be used to avoid overflow during the execution. The total number of accumulating nodes an≤|V| and the maximal number of active outgoing edges aoe≤|V| of a node, imply a bound on the accumulating field. Each edge is active when the dealer assigns 1 to the label of the edge. Unlike traditional deterministic automaton, in this case, there can be several edges from one node with the same label that lead to (at most |V|−1) distinct nodes. Note that aoe is bounded by |V|−1. The worst case is considered, where all accumulating nodes are lined one after the other (possibility according to a topological sort output), each multiplying its value by the number of outgoing arcs as an input to the next node in the line. Basically, for bounding the possible values, the maximal value that can be accumulated in the $i^{th}$ node is considered to be the value that is added after multiplication by aoe, to the marking of the $(i+1)^{st}$ node with each input.

Theorem 2

For an input stream of length n and a constant sized DAA the computing field of each node is in $\Theta(\log n)$ bits.

The Use of AA/DAA Beyond String Matching

Some applications of a DAG accumulating automaton will be described, which can recognize regular language, context free language and context sensitive language. Also several extensions are present, to the transition function of directed accumulating automaton, namely: the possibility of the dealer to ignore characters, the possibility of loops with unconditional arcs, denoted by the label 1, and harvesting of result by comparing values. In some cases, the graph of the DAA is not connected, thereby allowing the implementation of every connected component by a different set of participants. The structure and initial marking of each DAA that can recognize a particular language in the above classes, are given. Every DAA can be securely and privately executed according to the presented scheme.

Implementing a Flip Flop Automaton

Figure 8:
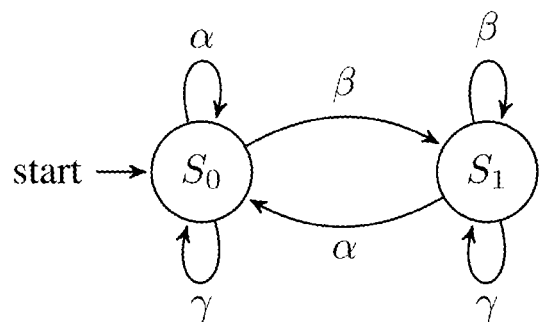
FIG. 8 illustrates an example of a DAG accumulating automaton $DAA^{\alpha(\alpha\beta\alpha)^*}$ for recognizing the regular language $\alpha(\alpha\beta\alpha)^*$ and the initial marking.

Assuming an automaton $A^{ff}$ depicted in FIG. 8, in which the initial state is $S_0$.

Initial Marking and Execution of $DAA^{ff}$

Figure 9:
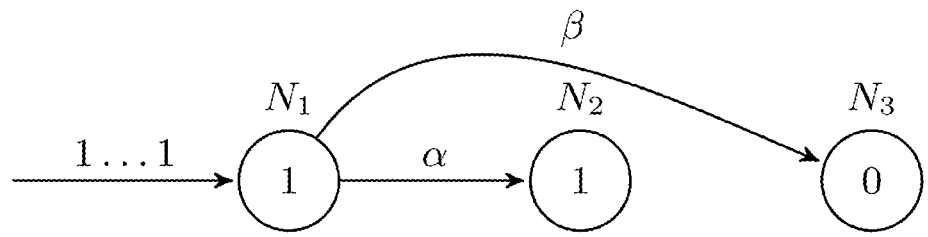
FIG. 9 illustrates an example of a DAG accumulating automaton $DAA^{\alpha^s\beta^s}$ for recognizing the regular language $\alpha^s\beta^s$ and the initial marking.

DAG accumulating automaton $DAA^{ff}$ of flip flop automaton can be found in FIG. 9.

The alphabet of $DAA^{ff}$ is $\Sigma=\{\alpha,\beta\}$. On initializing the automaton, $N_1$ is set to 1, $N_2$ is set to 1 and $N_3$ is set to 0. Let the $(k+1)^{th}$ input symbol be mapped to $\vec{v}=(v_0,v_1,v_2)$. The dealer will send different mapping vector depending on different input symbol. If the input symbol is $\alpha$, $\vec{v}$ is set to (1,1,0). If the input symbol is $\beta$, $\vec{v}$ is set to (1,0,1). If the input symbol is $\gamma$, the dealer will discard it. Such an action is allowed by the dealer, as well as sending spontaneous inputs and several characters in one input vector simultaneously. Then, the new value of all the nodes is computed as follows $$N_1^{(k+1)}=v_0$$

$$N_2^{(k+1)}=N_1^{(k)} \cdot v_1$$

$$N_3^{(k+1)}=N_1^{(k)} \cdot v_2 \qquad \text{Eq. (5)}$$

Result of $DAA^{ff}$

After any input symbol, it is possible to check the marking of $DAA^{ff}$. If $N_2$ is 1, the current state of automaton $A^{ff}$ is $S_0$. If $N_3$ is 1, the current state of automaton $A^{ff}$ is $S_1$.

Correctness of $DAA^{ff}$

According to the transitions of $DAA^{ff}$, it can be seen that if the input symbol is $\alpha$, $N_2$ will be set to 1. Also, if the input symbol is $\beta$, $N_1$ will be set to 0 and $N_2$ will be set to 1.

Figure 10:
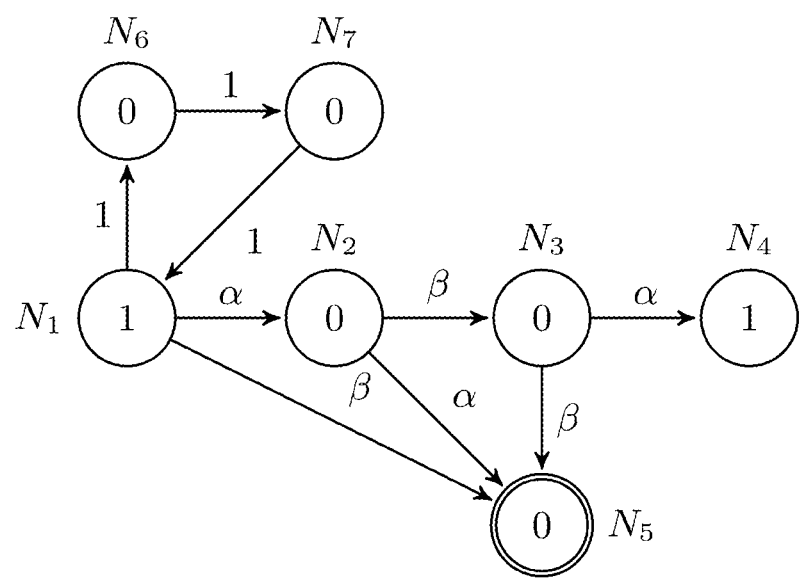
FIG. 10 illustrates an example of automata, mapped from two cascaded equations.

Recognizing Regular Language $(\alpha\beta\alpha)^*$ and $\alpha(\alpha\beta\alpha)^*$ Recognizing the Regular Language $(\alpha\beta\alpha)^*$ DAG accumulating automaton of the algorithm described in FIG. 10 is the DAG accumulating automaton $DAA^{(\alpha\beta\alpha)^*}$ for recognizing the regular language $(\alpha\beta\alpha)^*$. The alphabet of $DAA^{(\alpha\beta\alpha)^*}$ is $\Sigma=\{\alpha,\beta\}$. There is no free node in this automaton. The accumulating node is $N_5$.

Initial Marking and Execution of $DAA^{(\alpha\beta\alpha)^*}$

The first node $N_1$ is initially set to 1 while all the other nodes are initially set to 0. For each input symbol, the new marking of the automaton is computed. Let the $(k+1)^{th}$ input symbol be mapped to $\vec{v}=(v_1,v_2)$. If the input symbol is $\alpha$, $\vec{v}$ is set to (1,0). If the input symbol is $\beta$, $\vec{v}$ is set to (0,1).

The new value of all the regular nodes is computed as follows:

$$N_1^{(k+1)}=N_7^{(k)}$$

$$N_2^{(k+1)}=N_1^{(k)} \cdot v_1$$

$$N_3^{(k+1)}=N_2^{(k)} \cdot v_2$$

$$N_4^{(k+1)}=N_3^{(k)} \cdot v_1$$

$$N_6^{(k+1)}=N_1^{(k)}$$

$$N_7^{(k+1)}=N_6^{(k)} \qquad \text{Eq. (6)}$$

The new value of accumulating node $N_5$ is computed as follows $$N_5^{(k+1)} = N_5^{(k)} + N_1^{(k)} \cdot v_2 + N_2^{(k)} \cdot v_1 + N_3^{(k)} \cdot v_2 \qquad \text{Eq. (7)}$$

Result of $DAA^{(\alpha\beta\alpha)*}$

After any input symbol, it is possible to check the marking of $DAA^{(\alpha\beta\alpha)*}$. Only if $N_1=1$ and $N_5=0$, the input stream is accepted, otherwise rejected.

It should be noted that among the self-loop defined by $N_1$, $N_6$ and $N_7$, the degree for the secret sharing is not changed, since it involves multiplication by a constant 1.

Correctness of $DAA^{(\alpha\beta\alpha)*}$

According to the transitions of $DAA^{(\alpha\beta\alpha)*}$, it is clear that in the initial marking of the automaton, $N_4$ is set to 1, $N_5$ is set to 0. Also, if the input stream is $(\alpha\beta\alpha)*$, $N_4$ will be set to 1, $N_5$ stay 0. Also, if the input stream is not $(\alpha\beta\alpha)*$, $N_4$ will be set to 0 and/or $N_5$ will not be 0.

Figure 11:
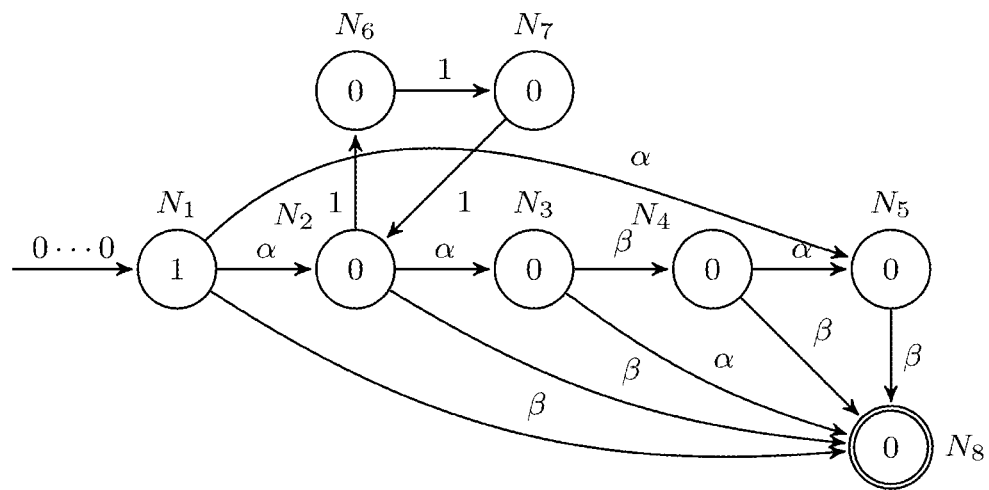
FIG. 11 illustrates an example of secure and private computation on a secret shared file among communication-less clouds.

Recognizing the Regular Language $\alpha(\alpha\beta\alpha)*$
DAG Accumulating Automaton of the Algorithm FIG. 11 illustrates the DAG accumulating automaton $DAA^{\alpha(\alpha\beta\alpha)*}$ for recognizing the regular language $\alpha(\alpha\beta\alpha)*$. The alphabet of $DAA^{\alpha(\alpha\beta\alpha)*}$ is $\Sigma = \{\alpha, \beta\}$.

Initial Marking and Execution of $DAA^{\alpha(\alpha\beta\alpha)*}$

The free node $N_1$ is initially set to 1 while all the other nodes are initially set to 0. For each input symbol, the new marking of the automaton is computed. Let the $(k+1)^{th}$ input symbol be mapped to $\vec{v} = (v_0, v_1, v_2)$ where $v_0$ is always set to 0. If the input symbol is $\alpha$, $\vec{v}$ is set to $(0,1,0)$. If the input symbol is $\beta$, $\vec{v}$ is set to $(0,0,1)$.

The new value of all the regular nodes is computed as follows $$N_1^{(k+1)} = v_0$$

$$N_2^{(k+1)} = N_1^{(k)} \cdot v_1 + N_7^{(k)}$$

$$N_3^{(k+1)} = N_2^{(k)} \cdot v_1$$

$$N_4^{(k+1)} = N_3^{(k)} \cdot v_2$$

$$N_5^{(k+1)} = N_1^{(k)} \cdot v_1 + N_4^{(k)} \cdot v_1$$

$$N_6^{(k+1)} = N_2^{(k)}$$

$$N_7^{(k+1)} = N_6^{(k)} \qquad \text{Eq. (8)}$$

The new value of the accumulating node $N_8$ is computed as follows $$N_8^{(k-1)} = N_8^{(k)} + N_1^{(k)} \cdot v_2 + N_2^{(k)} \cdot v_2 + N_3^{(k)} \cdot v_1 + N_4^{(k)} \cdot v_2 + N_5^{(k)} \cdot v_2 \qquad \text{Eq. (9)}$$

Result of $DAA^{\alpha(\alpha\beta\alpha)*}$

After any input symbol, it is possible to check the marking of $DAA^{\alpha(\alpha\beta\alpha)*}$. Only if $N_5=1$ and $N_8=0$, the input stream is accepted, otherwise rejected.

Correctness of $DAA^{\alpha(\alpha\beta\alpha)*}$

According to the transitions of $DAA^{\alpha(\alpha\beta\alpha)*}$ it is clear that in the initial marking of the automaton, $N_5$ is set to 0, $N_8$ is set to 0. Also, if the input stream is $\alpha$, $N_5$ will be set to 1, $N_8$ will stay 0. Also, if the input stream is $\alpha(\alpha\beta\alpha)*$, $N_5$ will be set to 1, $N_8$ will stay 0; (4) if the input stream is not $\alpha(\alpha\beta\alpha)*$ or $\alpha$, $N_5$ will be set to 0 or $N_8$ will not equal 0.

Figure 12:
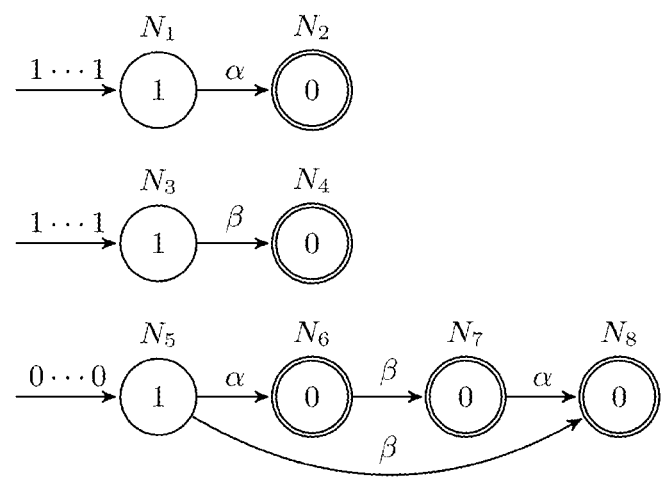
FIG. 12 illustrates the DAG accumulating automaton $DAA^{\alpha^s\beta^s}$ for recognizing the context free language $\alpha^s/\beta^s$.

Recognizing the Context Free Language $\alpha^s\beta^s$
DAG Accumulating Automaton of the Algorithm FIG. 12 illustrates the DAG accumulating automaton $DAA^{\alpha^s\beta^s}$ for recognizing the context free language $\alpha^s\beta^s$. The alphabet of $DAA^{\alpha^s\beta^s}$ is $\Sigma = \{\alpha, \beta\}$.

Initial Marking and Execution of $DAA^{\alpha^s\beta^s}$

All the free nodes $N_1$, $N_3$, $N_5$ are initially set to 1 while the other nodes are initially set to 0. Let the $(k+1)^{th}$ input symbol be mapped to $\vec{v} = (v_0, v'_0, v''_0, v_1, v_2)$, where $v_0$, $v'_0$ will always be set to 1 and $v''_0$ will always be set to 0. When the new marking of the automaton is computed, $v_0$ is given to $N_1$, $v'_0$ is given to $N_3$ and $v'_0$ is given to $N_5$. If the input symbol is $\alpha$, $\vec{v}$ is set to $(1,1,0,1,0)$. If the input symbol is $\beta$, $\vec{v}$ is set to $(1,1,0,0,1)$.

The new value of all the regular nodes is computed as follows $$N_1^{(k+1)} = v_0$$

$$N_3^{(k+1)} = v'_1$$

$$N_5^{(k+1)} = v''_1 \qquad \text{Eq. (10)}$$

All the accumulating nodes are computed as follows $$N_2^{(k+1)} = N_2^{(k)} - N_1^{(k)} \cdot v_1$$

$$N_3^{(k+1)} = N_4^{(k)} - N_3^{(k)} \cdot v_2$$

$$N_6^{(k+1)} = N_6^{(k)} - N_5^{(k)} \cdot v_2$$

$$N_7^{(k+1)} = N_7^{(k)} - N_6^{(k)} \cdot v_2$$

$$N_8^{(k+1)} = N_8^{(k)} - N_7^{(k)} \cdot v_1 + N_5^{(k)} \cdot v_2 \qquad \text{Eq. (11)}$$

Result of $DAA^{\alpha^s\beta^s}$

After any input symbol, it is possible to check the marking of $DAA^{\alpha^s\beta^s}$. If $N_8>0$, the input stream is rejected. Only if $N_2=N_4$ and $N_8=0$, the input stream is accepted.

Correctness of $DAA^{\alpha^s\beta^s}$

According to the transitions of $DAA^{\alpha^s\beta^s}$ and the input mapping, node $N_2$ and $N_4$ count all the $\alpha$ and $\beta$ symbols in the input stream respectively. While checking the input stream, if the first input symbol is $\beta$, node $N_8$ is set to 1, then there is one or more $\alpha$ symbols after symbol $\beta$, node $N_8$ increases by 1.

Figure 13:
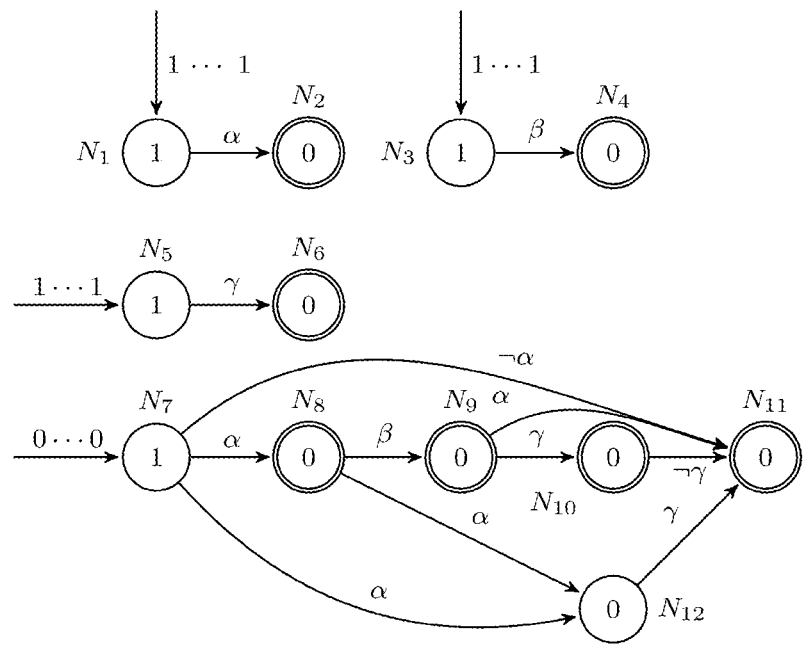
FIG. 13 illustrates a DAG accumulating automaton $DAA^{\alpha^s\beta^s\gamma^s}$ for recognizing the context sensitive language $\alpha^s\beta^s\gamma^s$.

Recognizing the Context Sensitive Language $\alpha^s\beta^s\gamma^s$
DAG Accumulating Automaton of the Algorithm FIG. 13 illustrates a DAG accumulating automaton $DAA^{\alpha^s\beta^s\gamma^s}$ for recognizing the context sensitive language $\alpha^s\beta^s\gamma^s$. The alphabet of $DAA^{\alpha^s\beta^s\gamma^s}$ is $\Sigma = \{\alpha, \beta, \gamma\}$.

Initial marking and execution of $DAA^{\alpha^s\beta^s}$

All the free nodes $N_1$, $N_3$, $N_5$, $N_7$ are initially set to 1 while the other nodes are initially set to 0. Let the $(k+1)^{th}$ input symbol be mapped to $\vec{v} = (v_0, v'_0, v''_0, v'''_0, v_1, v_2, v_3)$, where $v_0$, $v'_0$, $v''_0$ will always be set to 1 and $v'''_0$ will always be set to 0. When the new marking of the automaton is computed, $v_0$ is given to $N_1$, $v'_0$ is given to $N_3$, $v''_0$ is given to $N_5$ and $v'''_0$ is given to $N_7$. If the input symbol is $\alpha$, $\vec{v}$ is set to $(1,1,0,1,0)$. If the input symbol is $\beta$, $\vec{v}$ is set to $(1,1,0,0,1)$.

The new value of all the regular nodes is computed as follows $$N_1^{(k+1)} = v_0$$

$$N_3^{(k+1)} = v'_1$$

$$N_5^{(k+1)} = v''_1 \qquad \text{Eq. (12)}$$

All the accumulating nodes are computed as follows $$N_2^{(k+1)} = N_2^{(k)} + N_1^{(k)} \cdot v_1$$

$$N_4^{(k+1)} = N_4^{(k)} + N_3^{(k)} \cdot v_2$$

$$N_6^{(k+1)} = N_6^{(k)} + N_5^{(k)} \cdot v_1$$

$$N_7^{(k+1)} = N_7^{(k)} + N_6^{(k)} \cdot v_0$$

$$N_8^{(k+1)} = N_8^{(k)} + N_7^{(k)} \cdot v_1 + N_5^{(k)} \cdot v_2$$

In Equation 12, there are three equations $e_1$, $e_2$, $e_3$ with three variables $N_1$, $N_2$, $N_3$ and three inputs $v_1$, $v_2$, $v_3$.

Cascaded Equations Automata

When the input stream is actually unbounded, the present invention used a cascaded equations automata (which is a novel type of automata).

Cascaded equations will be defined first, as well as their execution. Then mapping of the cascaded equations into an automaton will be described.

Definition 7 (Execution of cascaded equations) Cascaded equations is a series of equations $e_1, e_{f2}, \ldots, e_f$ where the results and inputs of the first equations $e_1, e_{f2}, \ldots, e_i$ are used to compute the result of the next equation $e_{i+1}$. On the other hand, an equation $e_i$ cannot use the result of any $e_j$ such that $j<i$. Cascaded equations are computed serially from $e_1$ to $e_f$. The first equation is computed, then the second and so on. At the end, the last equation is computed.

Given the following cascaded equations:

$$e_1: N_1^{(k+1)} = N_1^{(k)} + v_1$$

$$e_2: N_2^{(k+1)} = N_2^{(k)} + N_1^{(k+1)} v_2 \quad \text{Eq. (13)}$$

There are two equations, $e_1$ and $e_2$, in the cascaded equations described in Eq. (13). The two equations compute a vector of variables $(N_1, N_2)$ using a vector of inputs $(v_1, v_2)$. Before executing the cascaded equations, the variables of the vector are initialized. Then, at the execution stage, new values for $N_1$ and $N_2$ are compute in a sequential fashion using modular two arithmetics, first using $e_1$ to compute $N_1$ and then using $e_2$ to compute $N_2$. The input symbols $(v_1, v_2)$ may have one of the possible values (00), (01), (10) and (11). The state of the automaton is defined by a vector of the values of $N_1$ and $N_2$. The vector may have the following values (00), (01), (10) or (11). A node of the automaton is denoted $s(N_1, N_2)$ and the input vector is denoted (11), (10), (01) and (00) by $\alpha$, $\beta$, $\gamma$ and $\tau$ respectively. By computing the cascaded equations using modular two arithmetics, it is possible to obtain the automaton depicted in FIG. 14a.

Next, the following cascaded equations are given:

$$e_1: N_1^{(k+1)} = v_1$$

$$e_2: N_2^{(k+1)} = N_2^{(k)} + N_1^{(k+1)} \cdot v_2 \quad \text{Eq. (14)}$$

Figure 14A:
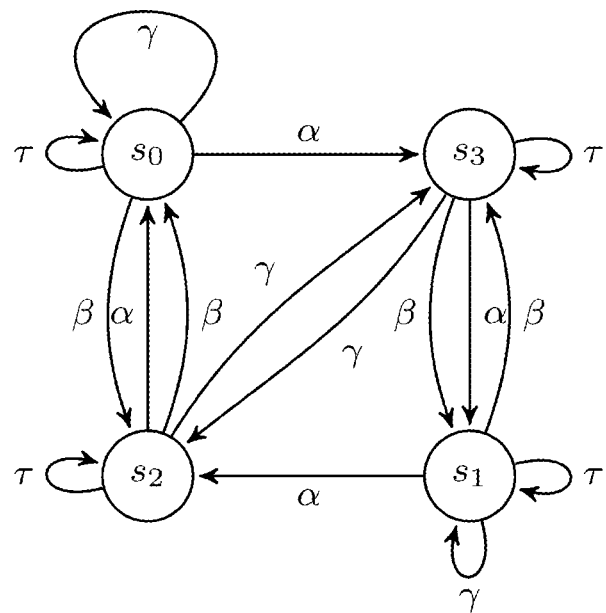
FIG. 14a illustrates a cascaded permutation automata.
Figure 14B:
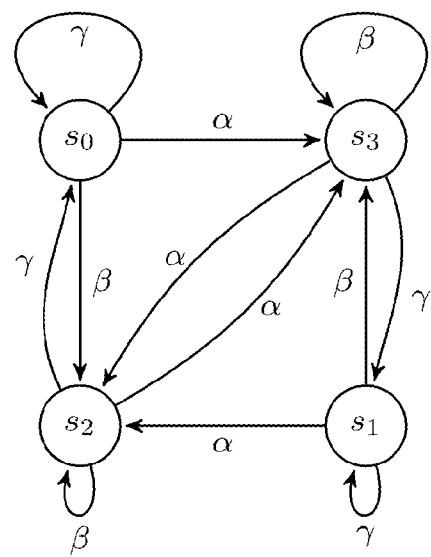
FIG. 14b illustrates a cascaded reset and permutation automata.

By computing the cascaded equations in Eq. (14) using arithmetic modular two, it is possible to get the corresponding automaton which is depicted in FIG. 14b. A node is denoted $s_{(N_1, N_2)}$. The input vector (11), (10) and (01) are denoted by $\alpha$, $\beta$ and $\gamma$ respectively.

Multi-Party Execution of Cascaded Equations Automata Over Strictly Unbounded Input Stream Secret sharing is used to allow secure multi-party executions of the cascaded equations automata. The execution of cascaded equations automata is performed into three stages: initial stage, execution stage and collection stage. The automaton in FIG. 14a is used to demonstrate how the multi-party execution is performed.

Initial Stage

Each variable's values in the cascaded equation automata are shared among several participants using secret sharing. Entries of the vector that represent each symbol of the input stream are also secret shared. For the particular example in FIG. 14a, it is assumed that the input symbols are represented by secret shares of polynomial of degree 1. If one equation includes multiplication, the degree of the polynomial that encodes the value of the variable will be more than the degree of the variable in the preceding equation. For the example of FIG. 14a, at least three participants must be used to ensure that $N_2$ can be secret shared correctly among all the participants. For the two variable $N_1$ and $N_2$, two random polynomials $f_1$ and $f_2$ with degree 1 and 2, are defined. Each corresponding polynomial is use to secret share each node's initial value among the three participants, each participant receives one share of $N_1$ and $N_2$.

Execution Stage

The dealer maps each input symbol $\alpha$ to an input vector $\vec{v}$. Then each element in the input vector $\vec{v}$ is secret shared into three parts by a random polynomial of degree 1. Each share of the input vector is then sent to one of the participants. Each participant computes the new value of $N_1$ and $N_2$, according to Eq. 13. Then, every participant gets the new share of $N_1$ and $N_2$.

Collection Stage

Whenever it is desired to compute the result of the algorithm, all the participants are asked to send the value that corresponds to $N$ and $N_2$ back. Having the shares of all participants, it is possible to reconstruct the actual value of $N_1$ and $N_2$ using Lagrange interpolation. The value obtained indicates the current state of the automaton in FIG. 14a.

Definitions of a Cascaded Equations Automaton:

Definition 8:

Mapping from cascaded equation to automaton Each equation in cascaded equations has a result. The results of the equations are selected to define a vector, the values of which encodes a node in the cascaded equations automaton. A vector of variables of the cascaded equations is regarded as the input symbols to the mapping automaton.

Every cascaded equations can be mapped to an automaton by mapping variables of the equations into a node of the automaton.

Theorem 3

The cascaded equations automata scheme information theoretically secures the inputs and the states of the automaton.

A product of automata may be defined by executing several cascade automata in parallel. Two or more cascade equations with the same input can be merged together to obtain a new automaton.

Theorem 4

Given that $A = A_1 \times \ldots \times A_k$ is a cascade product of automata and B is a permutation automaton, $|A_1| = \ldots = |A_k| = |B|$ and assuming that for every $i=1, \ldots, k$ the automaton $A_i$ is either a reset automaton or a permutation automaton that can be represented by a cascaded equation, where all transitions are in the same cyclic group as the transitions of B, Then, A can be secretly shared for unbounded split input by n+1 parties with threshold 1 where n is computed as follows:

Computing n:

Let $\Phi_i$ be a function of the input and the states of $A_1, \ldots, A_{i-1}$ that outputs the input for $A_i$. By representing $\Phi_i$ as a multivariate polynomial, its highest degree is of the form $$x_1^{\alpha_1} \cdot \ldots \cdot x_{i_l}^{\alpha_{i-1}}$$

$n_i$ is Defined to be $n_i = n_1 \cdot \alpha_1 + \ldots + n_{i-1} \cdot \alpha_{i-1}$. Then, n is defined by $\max(n_1, \ldots, n_k)$.

This result can be further generalized by having B (and each $A_i$) be either a reset automaton or a set of non-intersecting permutation automata (i.e., there are several non-intersecting sets of nodes, where each node is a permutation automaton). One additional generalization is the use of other modular operation (beyond mod 2) and hence larger fields.

The realization of non-permutation automaton as illustrated in FIG. 14b, yields an important generalization of pure permutation automaton, since permutation automaton can be implemented by using only additions of secret shares.

Secure and Private Repeated Computations on a Secret Shared File

Figure 15:
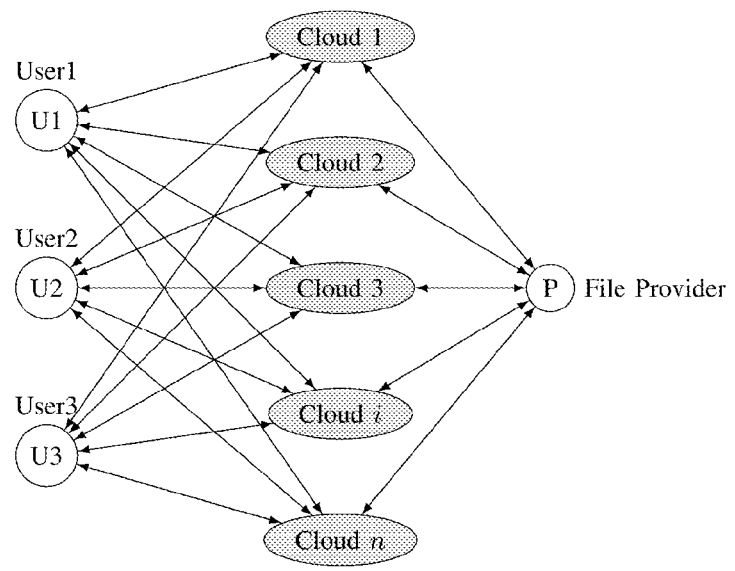
FIG. 15 illustrates secure and private computation on a secret shared file among communicationless clouds.

The methods introduced above are implemented on a fixed (large) file. Firstly, the file (e.g., biometric data) is secret shared and the shares are stored in clouds for future computation. Then it is possible to repeatedly and iteratively compute (for example, search the file for different strings) on the secret shared file by constructing the accumulating automaton for the needed computation and sending a copy of the automaton (possibly in different times) to each cloud that maintains shares of the file. Then, each cloud perform calculations on the accumulating automaton using their file share as the input. At the end, each cloud sends the final state of the accumulating automaton back as an answer for the computation request. The final states received from the cloud allow the reconstruction of the state of each node of the accumulating automaton to obtain the computation result (for example, whether or not the string was found). This scheme is depicted in FIG. 15 and includes the following stages:

Setup Stage

In this stage, the basic parameters for the whole scheme are defined: the Alphabet (e.g., ASCII, binary) that the scheme works on, the computation field of all the accumulating automata and the highest polynomial degree the system can deal with.

Initialization Stage

In this stage, the given file f, the chosen Alphabet and number of clouds are used to output secret shares of each character of the file, where each character is encoded by a vector of secret shares, one secret share for each possible character.

Automaton Construction Stage

This stage uses the user computation task as an input and outputs an automaton.

Automaton Execution Stage

This stage uses the accumulating automaton and the shares of the file to output the result of the computation. The result is the share of the final marking of the accumulating automaton.

Result Reconstruction Stage

This is the final stage, in which the user receives the marking shares to output the computation result.

Example of Implementation of the Scheme:

If a provider Peter wants to store a network log file in clouds and a user user David wants to search the string "attack America" in the file. But Peter does not want to give the whole file to David in clear text.

Firstly, Peter uses the Initialization stage to produce stream of shares of his log file (vector of shares for each character, character after a character) and then store each stream in a different cloud (or cloud virtual machine) not necessarily simultaneously. Clouds are not aware about their counterparts in the process. Then, David uses the Automaton Construction stage to get an accumulating automaton for the searching task (in some cases it is possible to give different independent parts of the accumulating automaton to different clouds). David sends the accumulating automaton to each cloud. Every cloud runs the Automaton Execution stage on its share of the file and the accumulating automaton. Each cloud sends the marks of the final states of the accumulating automaton back to David. David executes the Result Reconstruction stage to find the computation result. During the whole procedure, no cloud knows the exact network log file and only David knows the computation result.

It is possible to execute any string matching privately and securely in terms of information theoretically security. Other canonical examples of regular languages, context free languages and context sensitive languages can be computed efficiently in terms of information theoretical security. Remote authentication and data stream processing systems using cloud services can be implemented based on the schemes proposed by the present invention. It is also possible to design a general accumulating automata (in the style of FPGA), in which each original symbol is mapped to several symbols, so that the dealer is able to choose the non-participating arcs by always assigning zero to their labels. The information sent by malfunctioning participants or even malicious participants may be eliminated from the collected information by standard error correcting schemes, such as the Berlekamp Welch method (described in U.S. Pat. No. 4,633,470).

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method of securely executing an input stream of symbols, by non-interactive, multi-party computation, comprising:
   distributing, by a dealer, said input stream among a plurality of parties of servers or computation cloud components, which do not communicate among themselves throughout execution, wherein said dealer having a secret initial state, and distributing shares of said secret state between said plurality of parties;
   providing a finite-state automaton defined by a series of cascaded equations, to execute said input stream by a hardware processor, said automaton being a cascade product of component automata of different types and shared by said plurality of parties;
   at any execution stage, concealing said input stream and current state of the original automaton from any coalition of participants being smaller than a given threshold, wherein the threshold is a minimum number of participants required to reveal automaton states;
   upon receiving a signal from said dealer, said plurality of parties terminate their execution and submit their individual internal state to said dealer; and
   computing, by the dealer, the current state that defines the computation result.

2. A method according to claim 1, wherein the automaton is a reset automaton, or a permutation automaton, where all the component permutation automata are powers of the same automaton.

3. A method according to claim 1, wherein the results and inputs of the first equation are used to compute the result of the subsequent equation.

4. A method according to claim 1, wherein each cascaded equation is mapped to an automaton by mapping variables of the equations into a node of said automaton.

5. A method according to claim 1, wherein several cascade automata are executed in parallel, to get a product of automata.

6. A method according to claim 1, wherein during the execution stage, the dealer repeatedly sends secret shares of the input stream and each party computes new values.

7. A method according to claim 1, wherein the execution of a cascaded equations automata is performed by:
   an initial stage, during which the variable's values in said cascaded equations automata are shared among several parties using secret sharing, while each symbol of the input stream is also secret shared;
   an execution stage, during which each input symbol is mapped to an input vector and each element in the input vector is secret shared into three parts by a random polynomial of a degree of at least 1; and
   a collection stage, during which all the parties send their values back to the dealer, to reconstruct the actual value indicating the current state of the automaton.

8. A method according to claim 7, wherein the cascaded equations are executed by the parties by:
   initializing all the participants, during the initial stage;
   during the execution stage, sending shares to all participants, where each participant executes its equations independently; and
   during the collection stage, collecting the shares back from all participants and reconstructing the result.

9. A method according to claim 8, wherein during the initial stage:
   each variable's values in the cascaded equations automata are shared among several participants using secret sharing;
   entries of the vector that represent each symbol of the input stream are also secret shared; and
   if one equation includes multiplication, the degree of the polynomial that encodes the value of the variable will be higher than the degree of the variable in the preceding equation.

10. A method according to claim 9, wherein the input stream is executed to obtain:
    string matching;
    recognizing regular language;
    recognizing context free language;
    recognizing context sensitive language.

11. A method according to claim 10, wherein a copy of the automaton is sent to each cloud in different time.

12. A method according to claim 11, wherein string matching is performed for supporting database updates.

13. A method according to claim 11, wherein the database updates include delete or insert operations.

14. A method according to claim 10, wherein the DAA is implemented as a flip flop automaton.

15. A method according to claim 1, wherein the communication-less information theoretically secure multi-party computation is performed over practically infinite input streams, or oven infinite input streams.

16. A method according to claim 1, wherein the dealer is a stateless dealer.

17. A method according to claim 1, wherein the dealer temporarily stores and processes the input stream, and sends different secret shares of the input streams to the parties, which do not communicate with each other.

18. A method according to claim 1, wherein the parties do not return any information back to the dealer.

19. A method according to claim 1, wherein the at any point in the execution, in response to a call to the parties from the dealer to send their partial results back, said dealer reconstructs the actual computation result, based on said partial results.

20. A method according to claim 1, wherein the series of cascaded equations are executed serially starting from the first equation, then to the execution of the second equation and so forth, until the execution of the last equation is completed.

21. A method according to claim 1, wherein a string matching search is performed on a file by:
    secret sharing said file and storing the shares in computing clouds for further computation;
    repeatedly and iteratively running computaions on the secret shared file by constructing the accumulating automaton for the required computation;
    sending a copy of said automaton to each cloud that maintains shares of said file;
    allowing each cloud to perform calculations on said accumulating automaton using its share as the input;
    allowing each cloud to send the final state of its accumulating automaton back as an answer for a computation request; and
    reconstructing the state of each node of the accumulating automaton to obtain the computation result, based on the final state of the automata received from all clouds.

22. A method according to claim 1, further comprising carrying out wrong shares elimination whenever one or more parties send back corrupted information.

23. A method of securely executing a bounded input stream of symbols, by non-interactive, multi-party computation, comprising:
    distributing, by a dealer, said input stream among a plurality of parties, which do not communicate among themselves throughout execution, wherein said dealer having a secret initial state, and distributing shares of said secret state between said plurality of parties;
    providing an accumulating automaton to execute said input stream by a hardware processor, said accumulating automaton is shared by said plurality of parties and represented by a directed graph of transition functions which has a plurality of regular nodes, an accumulating node and transitions represented by a direct arc between two nodes, such that:
       said accumulating node accumulates values associated with a pattern, while said regular nodes recompute values, based on values of their neighboring nodes, wherein a value is initially set to a predetermined positive integer; and
       the value accumulated by said accumulating node that encodes the number of times the pattern has occurred in said input stream;
    at any execution stage, concealing the input symbol and current state of the original automaton from any coalition of participants being smaller than a given threshold, wherein the threshold is a minimum number of participants required to reveal automaton states;
    upon receiving a signal from said dealer, said plurality of parties terminate the execution and submit their individual internal state to said dealer; and
    computing, by the dealer, the current state that defines the computation result.

24. A method according to claim 23, wherein the accumulating automaton is a DAG Accumulating Automaton (DAA) represented by a directed acyclic graphs structure.

25. A method according to claim 24, wherein whenever communicationless multi-party computation is required, using m servers, performing the following steps:
    secret sharing the marking of the original DAA into m shares by the dealer;
    assigning each share to one of the servers;

secretly sharing by said dealer, each input into m shares and sending each share to a distinct server;

executing the local DAA share and the local input share of each server and obtaining a share of the new marking of the local DAA;

allowing said dealer to activate all m servers to send executed shares back;

collecting all executed shares; and constructing the current marking of said original DAA.

26. A method according to claim 23, further comprising marking the accumulating automaton by a vector of values, one integer value for each node in said accumulating automaton.

27. A method according to claim 23, wherein the accumulating automaton is executed by:

assigning an initial value to a node of said accumulating automaton;

retrieving symbols from the input stream that is sent by the dealer and inputting said symbols to said accumulating automaton; and responsive to inputting said symbols, triggering transitions of the automaton to a new marking.

28. A method according to claim 23, wherein the DAA is executed to obtain:

string matching;

supporting search, insert, and delete database operations;

recognizing regular language;

recognizing context free language;

recognizing context sensitive language.

29. A system for securely executing an input stream of symbols, by non-interactive, multi-party computation, comprising:

a dealer being a computerized apparatus having a secret initial state, said dealer distributing said input stream among a plurality of parties of servers or computation cloud components, which do not communicate among themselves throughout execution and do not exchange shares of said secret state with each other between said plurality of parties;

a finite-state automaton defined by a series of cascaded equations, to execute said input stream by a hardware processor, said automaton being a cascade product of component automata of different types and shared by said plurality of parties, or being an accumulating automaton for executing said input stream, wherein said accumulating automaton is shared by said plurality of parties and represented by a directed graph of transition functions which has a plurality of regular nodes, an accumulating node and transitions represented by a direction arc between two nodes, such that:

said accumulating node accumulates values associated with a pattern, while said regular nodes recompute values, based on values of their neighboring nodes, wherein a value is initially set to a predetermined positive ineger; and the value accumulated by said accmulating node encodes the number of times the pattern has occurred in said input stream;

wherein said dealer is configured to:

at any execution stage, conceal the input stream and current state of the original automaton from any coalition of participants being smaller than a given threshold, wherein the threshold is a minimum number of participants required to reveal automaton states;

upon receiving a signal from said dealer, cause said plurality of parties to terminate the execution and to submit their individual internal state to said dealer; and compute by said dealer the current state that defines the computation result.

* * * * *